US012587751B2

(12) United States Patent
Sa

(10) Patent No.: US 12,587,751 B2
(45) Date of Patent: Mar. 24, 2026

(54) METHOD AND SYSTEM FOR CONTROLLING SURROUND VIEW IN A LOW LIGHT ENVIRONMENT

(71) Applicant: HL KLEMOVE CORPORATION, Incheon (KR)

(72) Inventor: Youchan Sa, Incheon (KR)

(73) Assignee: HL KLEMOVE CORPORATION, Incheon (KR)

( * ) Notice: Subject to any disclaimer, the term of this patent is extended or adjusted under 35 U.S.C. 154(b) by 0 days.

(21) Appl. No.: 18/910,668

(22) Filed: Oct. 9, 2024

(65) Prior Publication Data

US 2025/0317656 A1      Oct. 9, 2025

(30) Foreign Application Priority Data

Apr. 4, 2024      (KR) ......................... 10-2024-0046105

(51) Int. Cl.
| | |
|---|---|
| *H04N 23/73* | (2023.01) |
| *B60R 1/27* | (2022.01) |
| *H04N 23/71* | (2023.01) |
| *H04N 23/75* | (2023.01) |

(52) U.S. Cl.
CPC .............. H04N 23/73 (2023.01); B60R 1/27 (2022.01); H04N 23/71 (2023.01); H04N 23/75 (2023.01); *B60R 2300/105* (2013.01); *B60R 2300/303* (2013.01)

(58) Field of Classification Search
CPC ........ H04N 23/71; H04N 23/73; H04N 23/75; B60R 1/27; B60R 230/105; B60R 230/303
See application file for complete search history.

(56) References Cited

U.S. PATENT DOCUMENTS

| | | | | |
|---|---|---|---|---|
| 8,872,918 | B2 * | 10/2014 | Krokel | H04N 23/73 |
| | | | | 348/148 |
| 8,902,313 | B2 * | 12/2014 | Rottner | B60R 1/27 |
| | | | | 348/148 |
| 9,508,014 | B2 * | 11/2016 | Lu | B32B 17/10477 |
| 9,800,794 | B2 * | 10/2017 | Weber | H04N 23/73 |
| 10,744,941 | B2 * | 8/2020 | Karas | G08G 1/168 |
| 11,589,443 | B1 * | 2/2023 | Niedert | H05B 47/105 |
| 2013/0107048 | A1 * | 5/2013 | Rottner | B60R 1/27 |
| | | | | 348/148 |
| 2014/0112528 | A1 * | 4/2014 | King | G06V 20/59 |
| | | | | 382/103 |
| 2014/0354811 | A1 * | 12/2014 | Weber | B60R 1/23 |
| | | | | 348/148 |
| 2018/0086266 | A1 * | 3/2018 | Yamaguchi | H04N 23/698 |
| 2018/0131884 | A1 * | 5/2018 | Nishikawa | H04N 25/589 |
| 2018/0334099 | A1 * | 11/2018 | Gao | B60R 1/23 |
| 2019/0149712 | A1 * | 5/2019 | Katsuyama | H04N 23/71 |
| | | | | 348/148 |
| 2019/0193633 | A1 * | 6/2019 | Ichikawa | B60R 21/00 |

(Continued)

*Primary Examiner* — Brian P Yenke

(74) *Attorney, Agent, or Firm* — Seed Intellectual Property Law Group LLP

(57) ABSTRACT

A method of controlling a surround view is disclosed. The method of controlling a surround view according to the present disclosure includes operating the surround view based on a first FPS value, calculating brightness and determining whether the brightness is less than a first set value, and operating the surround view based on a second FPS value lower than the first FPS value when the brightness is less than the first set value.

19 Claims, 12 Drawing Sheets

(56)                References Cited

U.S. PATENT DOCUMENTS

| | | | |
|---|---|---|---|
| 2020/0120255 A1* | 4/2020 | Choi | H04N 23/667 |
| 2020/0169656 A1* | 5/2020 | Yamaoka | H04N 7/18 |
| 2020/0169689 A1* | 5/2020 | Hirooka | H04N 23/90 |
| 2020/0244864 A1* | 7/2020 | Kida | B60R 11/04 |
| 2020/0304752 A1* | 9/2020 | Aluru | H04N 7/0117 |
| 2021/0006763 A1* | 1/2021 | Heshmat Dehkordi | H04N 13/307 |
| 2021/0160432 A1* | 5/2021 | Yamamoto | B60R 1/27 |
| 2021/0170949 A1* | 6/2021 | Guirlanda | B60R 1/23 |
| 2024/0163563 A1* | 5/2024 | Fu | H04N 23/74 |
| 2024/0296682 A1* | 9/2024 | Bowers | H04N 23/684 |

* cited by examiner

140 : 141, 142, 143, 144

S210

S211

RECEIVE IMAGE AND CALCULATE BRIGHTNESS

S212

BRIGHTNESS < SECOND SET VALUE?          NO

YES

S213

EXPOSURE TIME <
MAXIMUM EXPOSURE TIME?          NO

YES

S220

INCREASE EXPOSURE TIME OF IMAGE SENSOR —— S214

S230

S230

RECEIVE VEHICLE MOVEMENT INFORMATION — S236

CONTROL IMAGE WITH SECOND FPS VALUE FOR REGION CORRESPONDING TO MOVEMENT DIRECTION — S237

RECEIVE IMAGE AND CALCULATE BRIGHTNESS — S232-1

BRIGHTNESS < SECOND SET VALUE? — S233-1    NO

YES

EXPOSURE TIME < MAXIMUM EXPOSURE TIME? — S234-1    NO

YES

INCREASE EXPOSURE TIME OF IMAGE SENSOR

S235-1

OPERATE BASED ON THIRD FPS VALUE

S250-1

METHOD AND SYSTEM FOR CONTROLLING SURROUND VIEW IN A LOW LIGHT ENVIRONMENT

CROSS-REFERENCE TO RELATED APPLICATION

This application claims priority to and the benefit of Korean Patent Application No. 10-2024-0046105, filed on Apr. 4, 2024, the disclosure of which is incorporated herein by reference in its entirety.

BACKGROUND

Technical Field

The present disclosure relates to a method and system for controlling a surround view in a low light environment.

Description of Related Art

A surround view monitor (SVM) has a function of processing and synthesizing images captured by cameras mounted on the front, rear, left, and right sides of a vehicle and outputting a main view such as rear, front, or side, and a top view, as if looking at the vehicle from above, to a head unit. The main view and the top view may output selectively or simultaneously.

A surround view may operate in situations where the vehicle is moving forward or backward at low speeds of 10 km/h or less, and through images, a vehicle and parking lines, obstacles, and pedestrians around the vehicle may be displayed so that a positional relationship with the vehicle may be checked.

A surround view system in the related art prioritizes securing high-quality and smooth images through fixed image input/output frame per second (FPS), changes in image sensor exposure (shutter speed) within an FPS limit, and output gain adjustment. However, in limiting situations where a sufficient amount of light is not secured, such as when there is not enough surrounding lighting at night, the image has to appear dark, and thus it is not possible to secure visibility of surrounding obstacles.

There are RGB-IR cameras capable of infrared photography, but development for new cameras and hardware and software development for new image signal processing (ISP) are required.

BRIEF SUMMARY

The present disclosure is directed to providing a method and system for controlling a surround view in a low light environment capable of responding to limiting situations by adjusting FPS and an image sensor exposure time even in an environment with an insufficient amount of light, such as at night.

In order to solve the aforementioned problems, according to an aspect of the present disclosure, there is provided a system for controlling a surround view in a low light environment, the system including a camera unit including a plurality of cameras that acquire images in at least two directions of a vehicle, an image synthesizer configured to synthesize a plurality of images acquired from the camera unit into one image, a display unit configured to display the synthesized image in a surround view, and a controller, and the controller operates the surround view based on a first frame per second (FPS) value, and the controller calculates brightness from the images received from the camera unit, and operates the surround view based on a second FPS value lower than the first FPS value when the brightness is less than a first set value.

In one embodiment of the present disclosure, the controller may operate the surround view based on the second FPS value lower than the first FPS value when night mode input is recognized by a user.

In one embodiment of the present disclosure, the display unit may display selection information of options including FPS priority, brightness priority, and a default setting, the controller may operate the surround view based on the second FPS value lower than the first FPS value by changing a condition according to the selection information of options, the default setting may be conditioned on whether the brightness of the image captured for the surround view is less than the first set value, the FPS priority may be conditioned on whether the first set value is set to be lower than the default setting and the brightness of the image captured for the surround view is less than the first set value, and the brightness priority may be conditioned on whether the first set value is set to be higher than the default setting and the brightness of the image captured for the surround view is less than the first set value.

In one embodiment of the present disclosure, the system for controlling a surround view may further include a proximity sensor configured to detect proximity to an external object, and the controller may operate the surround view based on the second FPS value lower than the first FPS value when the proximity is detected.

In one embodiment of the present disclosure, the controller may increase an exposure time of an image sensor of the camera unit when brightness of an image acquired by the second FPS value is less than a second set value, and the second set value may be a value greater than the first set value.

In one embodiment of the present disclosure, the controller may return to the first FPS value when brightness of an image acquired by the second FPS value is greater than or equal to a third set value.

In one embodiment of the present disclosure, the first FPS value may be 30 FPS, and the second FPS value may be 15 FPS.

In one embodiment of the present disclosure, surround view operation based on the second FPS value may be applied only to some among a front region, a rear region, a left region, and a right region.

In one embodiment of the present disclosure, the controller may receive movement information about the vehicle, and determine a region to which operation based on the second FPS value is to be applied among the regions of the surround view corresponding to the movement information.

In one embodiment of the present disclosure, the controller may compare a vehicle speed with a preset speed, and return surround view operation based on the second FPS value to surround view operation based on the first FPS value according to the comparison result.

In one embodiment of the present disclosure, the controller may interpolate the brightness of some of the images based on the first FPS value after the returning so that a sudden change in brightness does not occur upon the returning.

In order to solve the aforementioned problems, according to another aspect of the present disclosure, there is provided a system for controlling a surround view in a low light environment, including a camera unit including a plurality of cameras that acquire images in at least two directions of a vehicle, an image synthesizer configured to synthesize a plurality of images acquired from the camera unit into one image, a display unit configured to display the synthesized image in a surround view, and a controller, the controller operates the surround view based on a first frame per second (FPS) value, and the controller calculates brightness of each of a front region, a rear region, a left region, and a right region from images received from the camera unit, and operates the surround view based on a second FPS value lower than the first FPS value for each region when the brightness corresponding to the region is less than a first set value.

In order to solve the aforementioned problems, according to still another aspect of the present disclosure, there is provided a method of controlling a surround view in a low light environment including operating the surround view based on a first FPS value, calculating brightness and determining whether the brightness is less than a first set value, and operating the surround view based on a second FPS value lower than the first FPS value when the brightness is less than the first set value.

In one embodiment of the present disclosure, the operating of the surround view based on the second FPS value may include receiving an image based on the second FPS value, calculating brightness of the image, determining whether the calculated brightness of the image is less than a second set value, and increasing an exposure time of an image sensor of a camera unit when the calculated brightness of the image is less than the second set value, and the second set value may be a value greater than the first set value.

In one embodiment of the present disclosure, the operating of the surround view based on the first FPS value may include receiving an image based on the second FPS value, calculating brightness of the image, determining whether the calculated brightness of the image is greater than or equal to a third set value, and returning to the first FPS value when the calculated brightness of the image is greater than or equal to the third set value.

In one embodiment of the present disclosure, the first FPS value may be 30 FPS, and the second FPS value may be 15 FPS.

In one embodiment of the present disclosure, surround view operation based on the second FPS value may be applied only to some among a front region, a rear region, a left region, and a right region.

In one embodiment of the present disclosure, the method may further include receiving movement information about a vehicle, and determining a region to which operation based on the second FPS value is to be applied among the regions of the surround view corresponding to the movement information.

In one embodiment of the present disclosure, the method may further include comparing a vehicle speed with a preset speed, and returning surround view operation based on the second FPS value to surround view operation based on the first FPS value according to the comparison result.

In one embodiment of the present disclosure, the method may further include interpolating the brightness of some of the images based on the first FPS value after the returning so that a sudden change in brightness does not occur upon the returning.

BRIEF DESCRIPTION OF THE SEVERAL VIEWS OF THE DRAWINGS

The above and other objects, features and advantages of the present disclosure will become more apparent to those of

Figure 1:
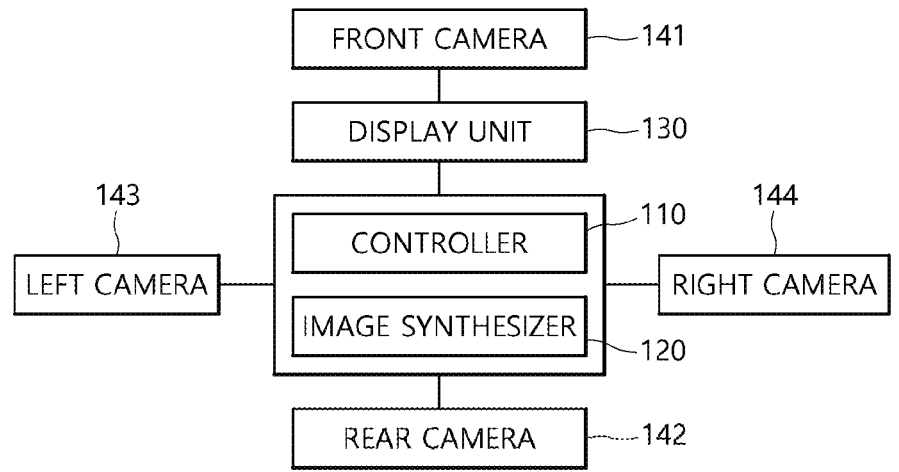
Figure 2:
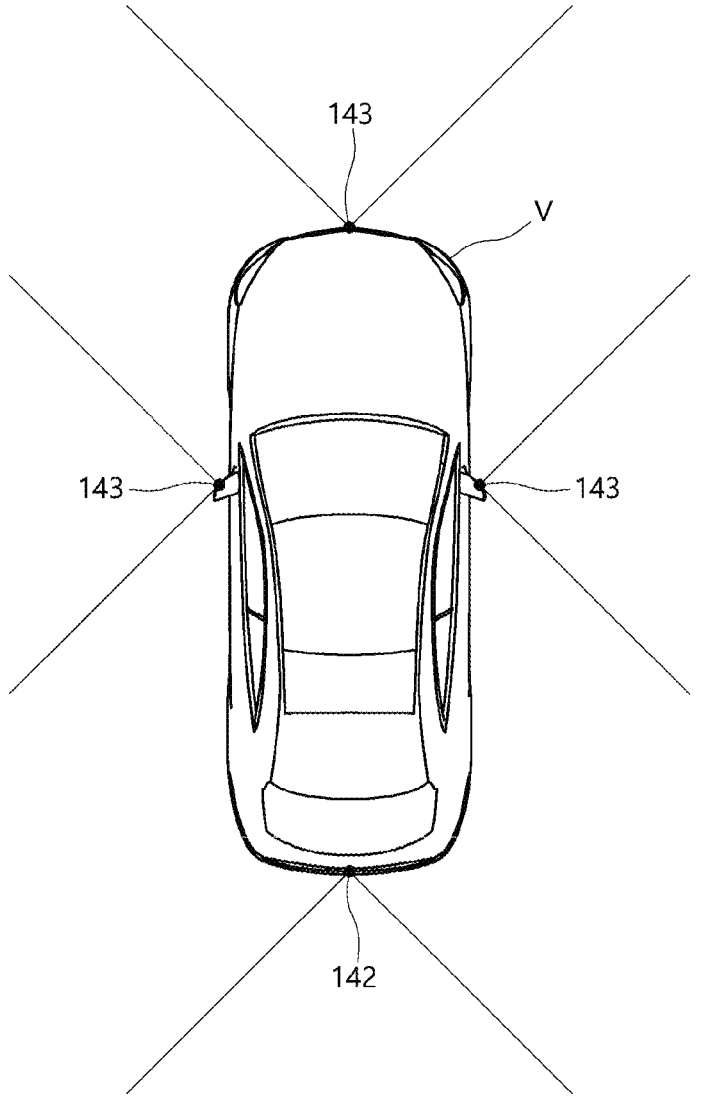
Figure 3:
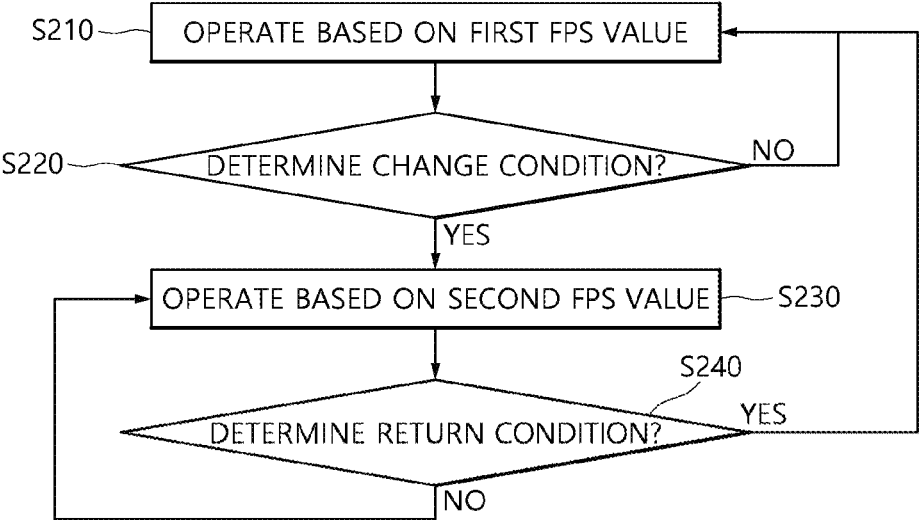
Figure 4:
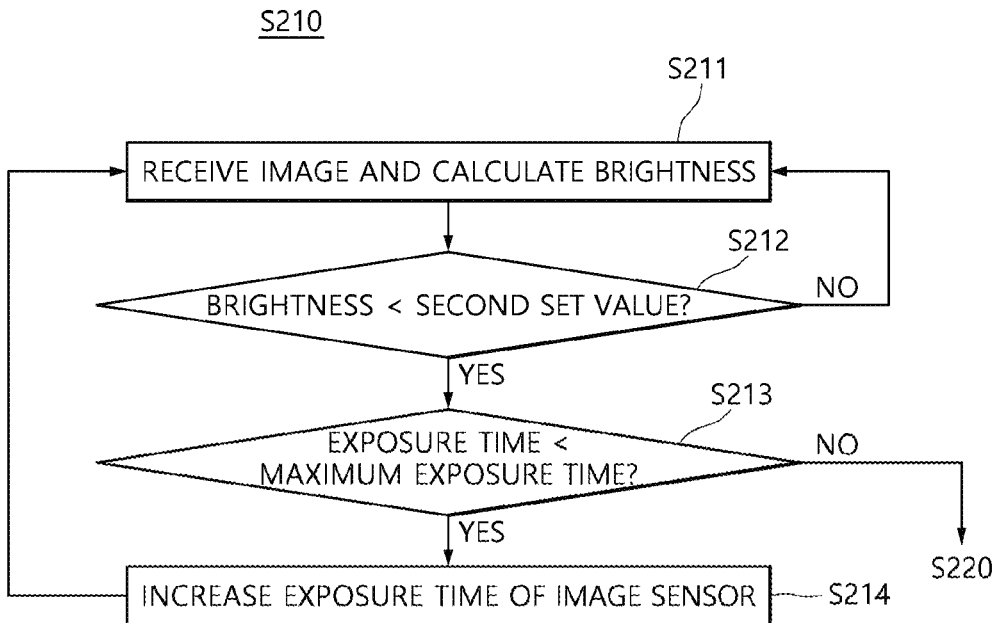
Figure 5:
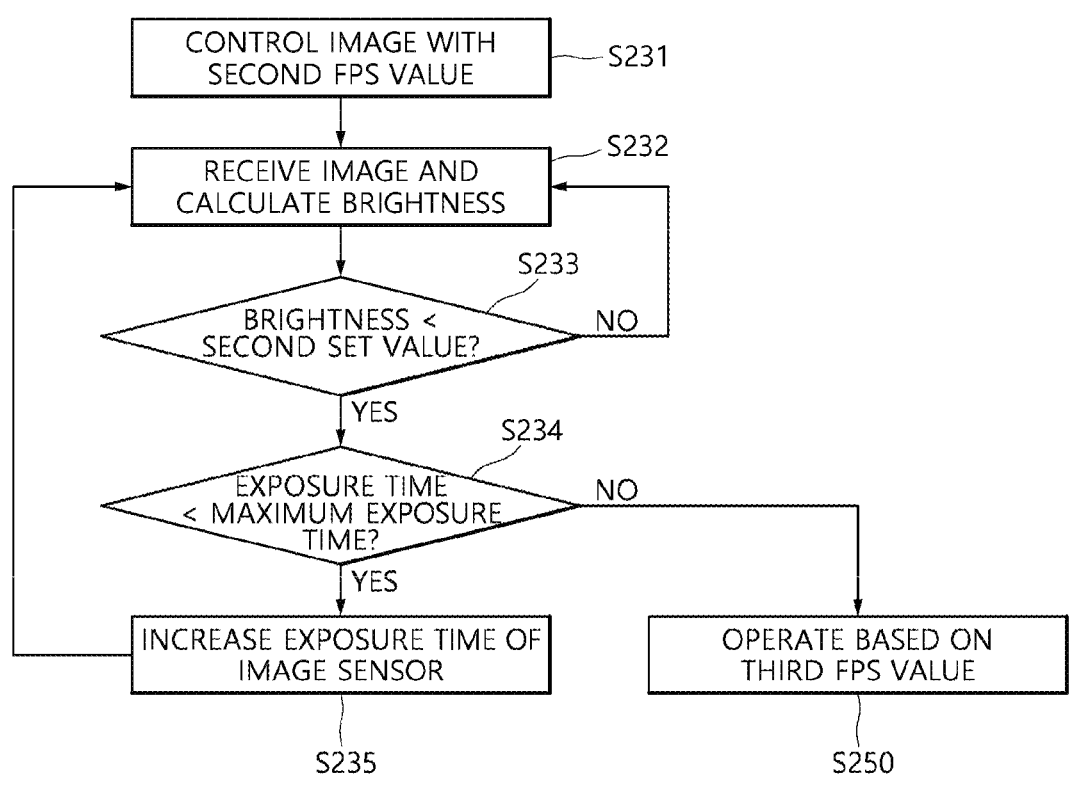
Figure 6:
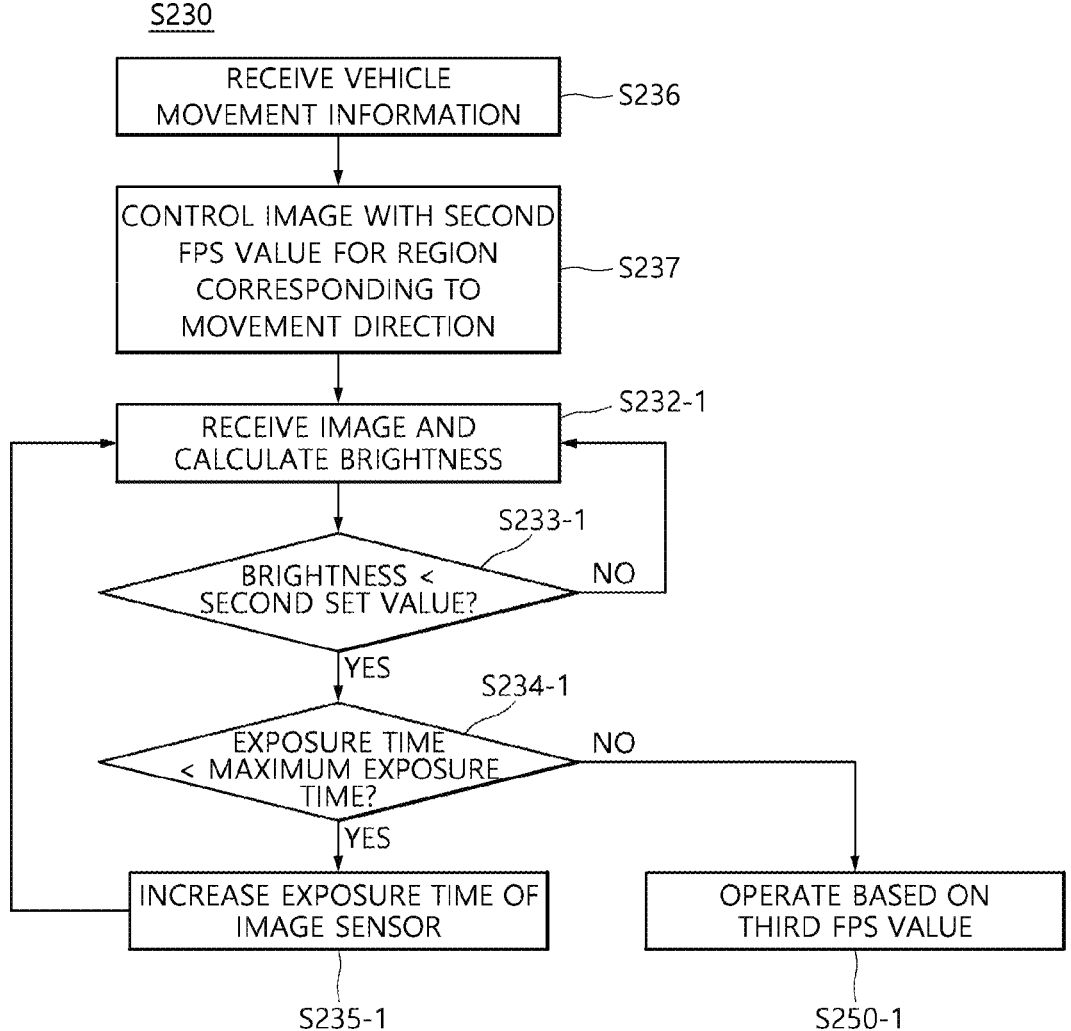
Figure 7:
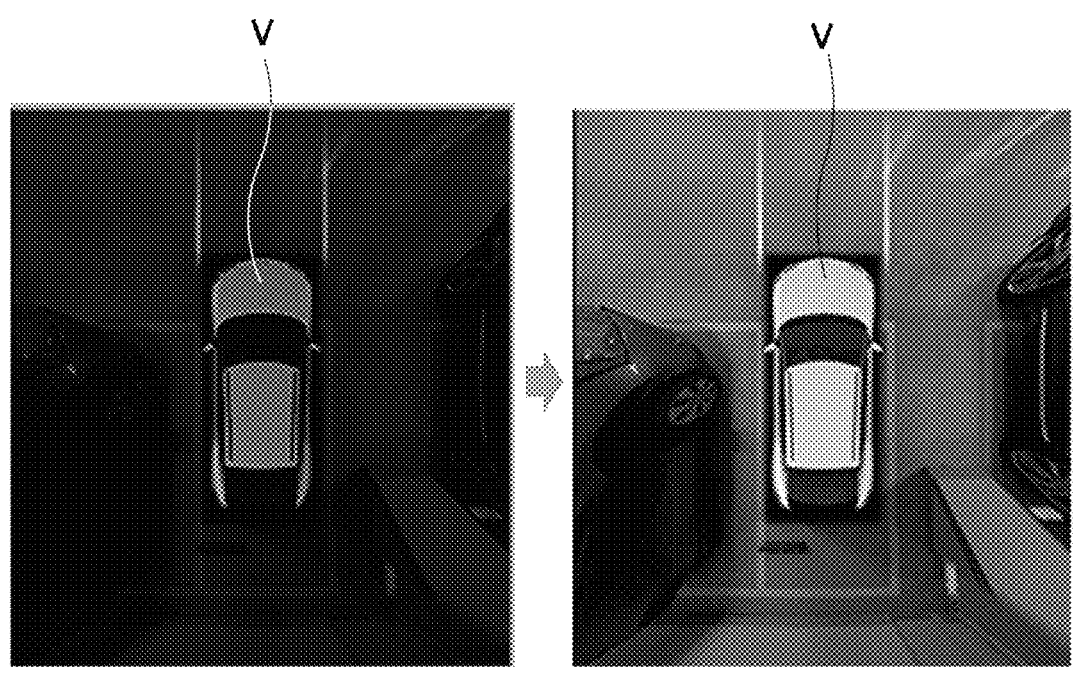
Figure 8:
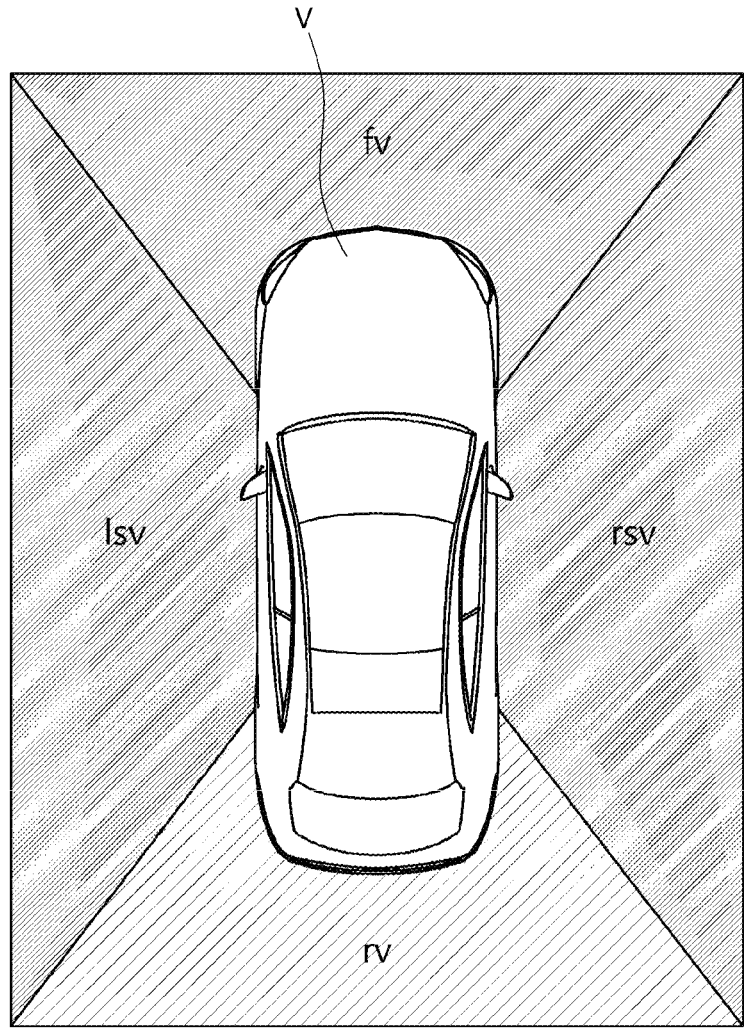
Figure 9:
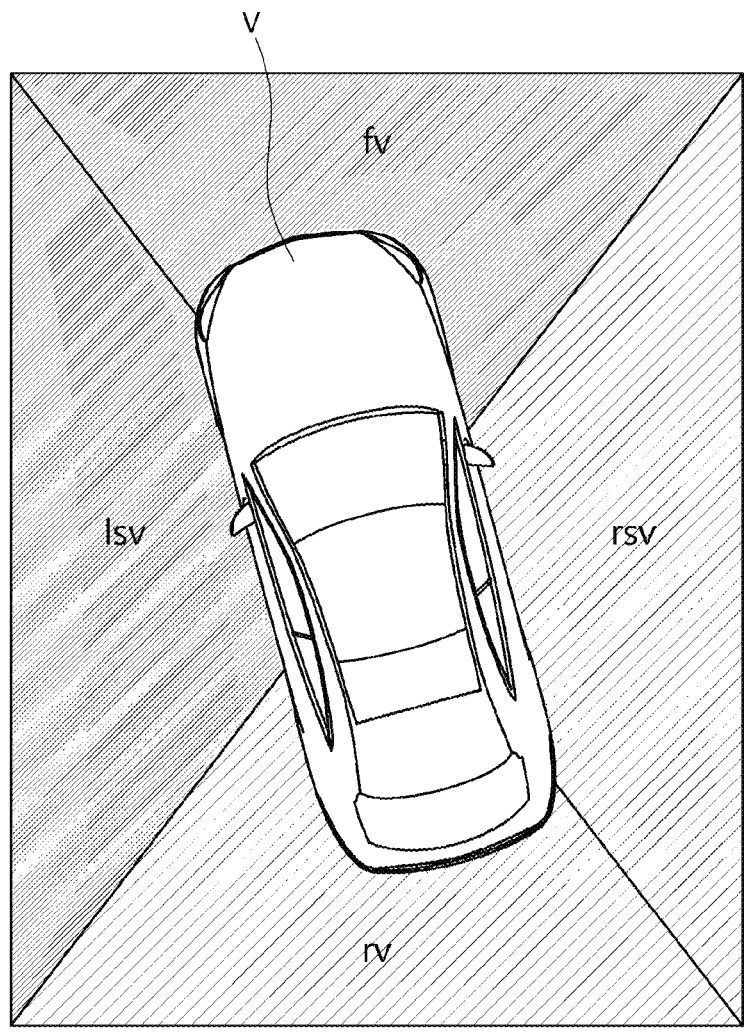
Figure 10:
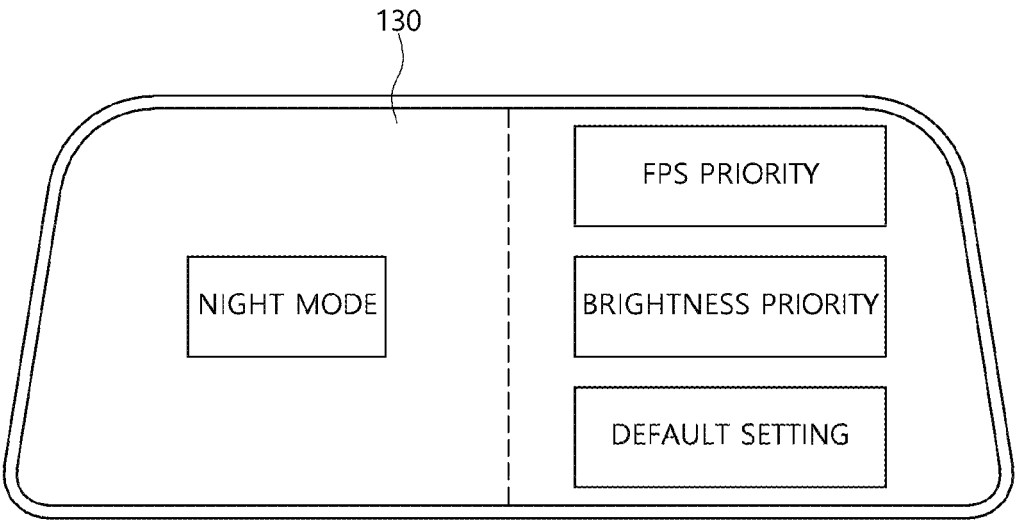
Figure 11:
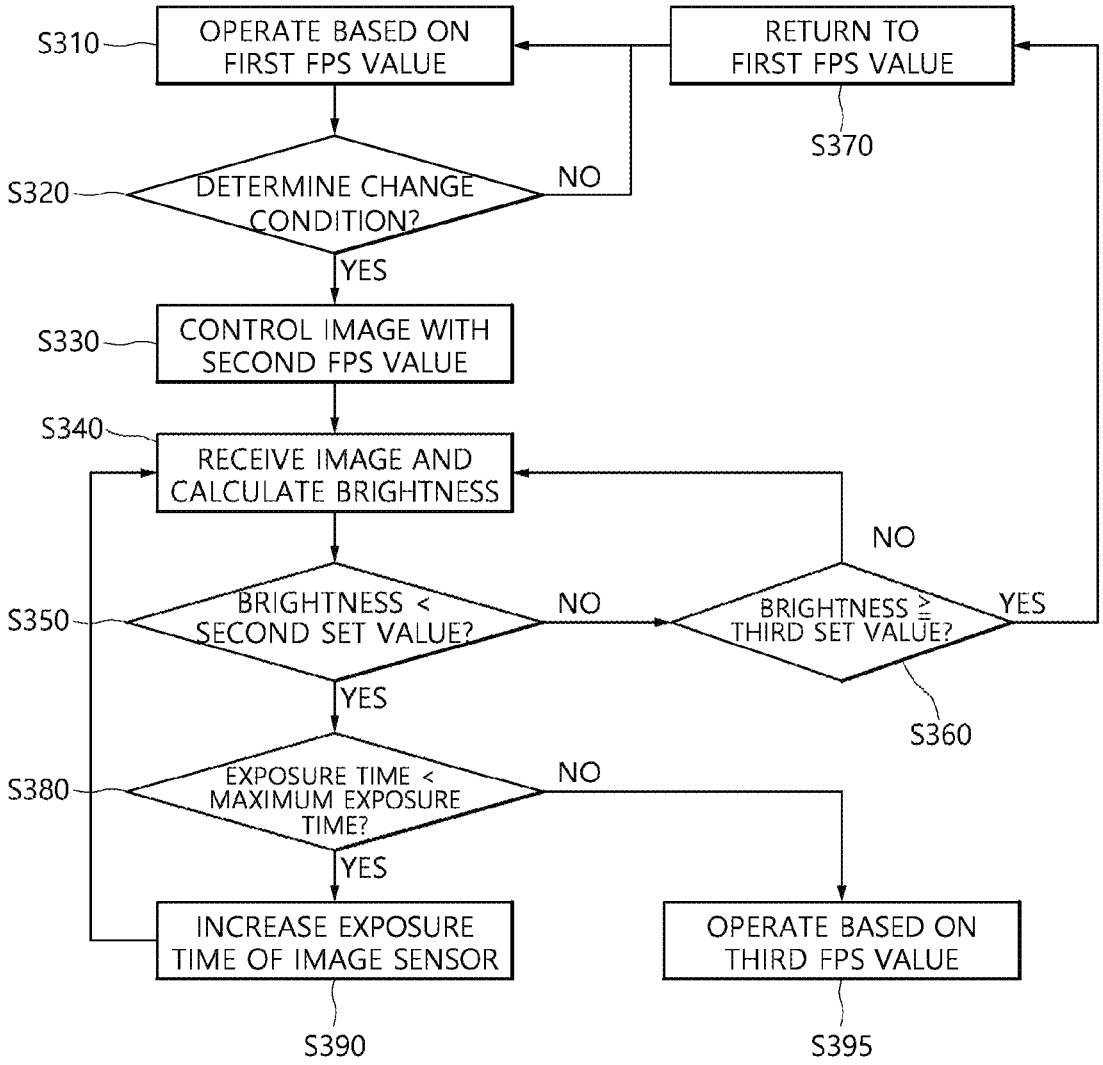
Figure 12:
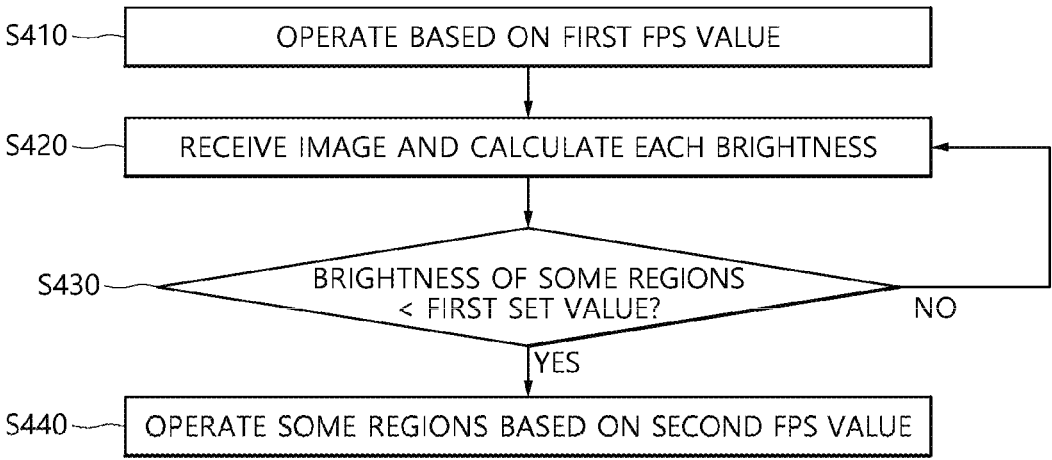
Figure 13:
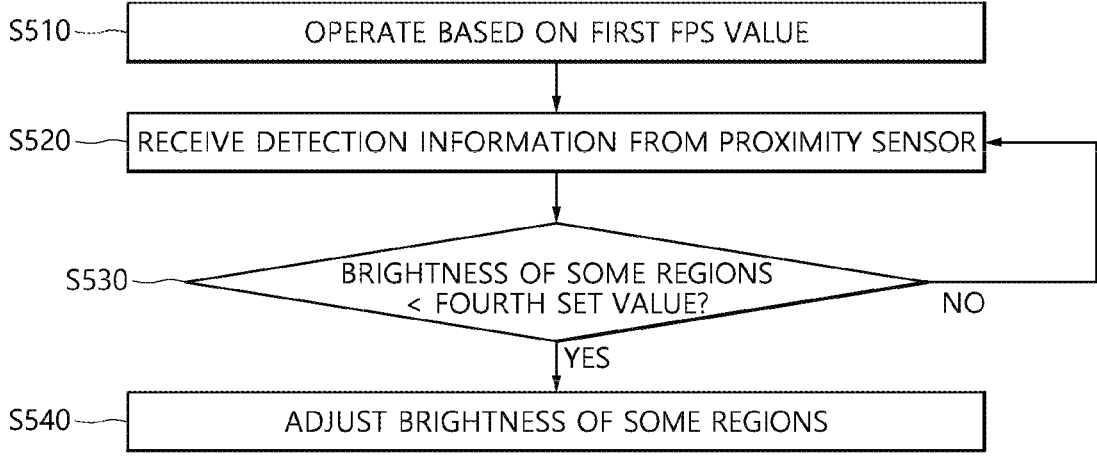

4 ordinary skill in the art by describing exemplary embodiments thereof in detail with reference to the accompanying drawings, in which:

FIG. 1 illustrates a system for controlling a surround view in a low light environment according to one embodiment of the present disclosure;

FIG. 2 illustrates a partial configuration of the system for controlling a surround view in a low light environment according to one embodiment of the present disclosure;

FIG. 3 illustrates a method of controlling a surround view in a low light environment according to one embodiment of the present disclosure;

FIG. 4 illustrates a partial configuration of the method of controlling a surround view in a low light environment according to one embodiment of the present disclosure in detail;

FIG. 5 illustrates a partial configuration of the method of controlling a surround view in a low light environment according to one embodiment of the present disclosure in detail;

FIG. 6 illustrates a partial configuration of the method of controlling a surround view in a low light environment according to one embodiment of the present disclosure in detail;

FIG. 7 illustrates a change in a surround view displayed according to an embodiment of the present disclosure;

FIG. 8 illustrates a surround view displayed differently for each region according to an embodiment of the present disclosure;

FIG. 9 illustrates a surround view displayed differently for each region according to an embodiment of the present disclosure;

FIG. 10 illustrates a surround view setting screen according to an embodiment of the present disclosure;

FIG. 11 illustrates a method of controlling a surround view in a low light environment according to one embodiment of the present disclosure;

FIG. 12 illustrates a method of controlling a surround view in a low light environment according to one embodiment of the present disclosure; and FIG. 13 illustrates a method of controlling a surround view in a low light environment according to one embodiment of the present disclosure.

DETAILED DESCRIPTION

Since the present disclosure may be variously modified and embodied, particular embodiments thereof will be illustrated in the drawings and described in detail. However, this is not intended to limit the present disclosure to the specific embodiments, and it should be understood to include all modifications, equivalents, and substitutes included in the spirit and scope of the present disclosure.

In describing the present disclosure, when it is determined that the detailed description of the related known technology may obscure the subject matter of the present disclosure, the detailed description thereof will be omitted.

Hereinafter, embodiments of the present disclosure will be described in detail with reference to the drawings.

FIG. 1 illustrates a system for controlling a surround view in a low light environment according to one embodiment of the present disclosure.

Referring to FIG. 1, the system for controlling a surround view in a low light environment according to one embodiment of the present disclosure includes a controller 110, an image synthesizer 120, a display unit 130, and a camera unit 140.

The controller 110 is connected to each of the image synthesizer 120, the display unit 130, and the camera unit 140, and controls the image synthesizer 120, the display unit 130, and the camera unit 140.

The controller 110 may include a processor installed inside a vehicle.

In addition to the aforementioned components, the controller 110 may receive information related to vehicle operation, such as a speed, a remaining fuel amount, steering wheel rotation information, and proximity sensor information, from internal devices of the vehicle.

The image synthesizer 120 processes and synthesizes images acquired from a front camera 141, a rear camera 142, a left camera 143, and a right camera 144. The synthesized image may be output to the display unit 130.

Since the image synthesizer 120 may be controlled by the controller 110, a role of the image synthesizer 120 may be described as being performed by the controller 110, but this may be understood as being due to the cooperative work of the image synthesizer 120 and the controller 110.

The display unit 130 may be a component of a head unit installed on a vehicle dashboard. The display unit 130 may include a touch screen.

The display unit 130 may output a synthesized image, and output the synthesized image and an image from a viewpoint of at least one of the front camera 141, rear camera 142, left camera 143, and right camera 144 simultaneously and in divided sections. The synthesized image may refer to an image obtained by converting and synthesizing images from the viewpoints of the front camera 141, the rear camera 142, the left camera 143, and the right camera 144 so that the images are viewed from the top viewpoint.

The camera unit 140 includes the front camera 141, the rear camera 142, the left camera 143, and the right camera 144.

The front camera 141 includes an image sensor and acquires images of a front region of a vehicle v in units of frames.

The rear camera 142 includes an image sensor and acquires images of a rear region of the vehicle v in units of frames.

The left camera 143 includes an image sensor and acquires images of a left region of the vehicle v in units of frames.

The right camera 144 includes an image sensor and acquires images of a right region of the vehicle v in units of frames.

The images acquired by each camera may be synthesized into one image in the image synthesizer 120, output in the same frame unit, and provided as a top view on the display unit 130.

FIG. 2 visually shows a point where each camera is installed in the vehicle v and a photographing region. The front camera 141 may be installed on the front of the vehicle v, the rear camera 142 may be installed on the rear of the vehicle v, the left camera 143 may be installed on a left side mirror of the vehicle v, and the right camera 144 may be installed on a right side mirror of the vehicle v.

In the embodiment of the present disclosure, the camera unit 140 is illustrated as including four cameras, but is not limited thereto, and additional cameras may be installed between the cameras or at other positions, such as on top.

The controller 110 may operate the surround view based on the first FPS value.

Operating the surround view may be a concept that includes all necessary settings, controls, outputs, and the like, from acquiring images by controlling the camera unit 140 to synthesizing and displaying the images.

The controller 110 may set brightness as one control variable in surround view operation.

Brightness may be calculated by receiving an image and using information from the image.

The image may be one of the images acquired from each camera of the camera unit 140 or a synthesized image thereof.

When calculating the brightness of the image, the controller 110 may average the value of each pixel of the image. The brightness of the image may also be calculated by averaging the value of each pixel of a gray scale image.

According to the embodiment, the brightness may be a value measured by an illumination sensor (not illustrated). In this case, the controller 110 does not need to receive an image to determine the brightness, and may generate a value related to the brightness only with a value provided by the illumination sensor.

When operating the surround view based on the first FPS value, the controller 110 determines whether the brightness is less than a second set value.

When the brightness is less than the second set value, the controller 110 may increase the brightness of the image by increasing an exposure time of an image sensor of each camera of the camera unit 140.

When the first FPS is 30 FPS, the maximum exposure time of the image sensor is 1/30 sec.

On the other hand, when the brightness is less than the second set value, further less than the first set value even though the exposure time of the image sensor is maximized at the current FPS, the controller 110 may terminate the operation based on the first FPS and operate the surround view based on the second FPS.

The controller 110 may change the FPS according to another change condition in addition to the brightness.

For example, a case where a user of the vehicle v inputs a button preset to operate by the second FPS may be set as the change condition.

For example, a case where a vehicle speed is greater than or equal to a preset speed or less than the preset speed may be set as the change condition.

For example, a case where a proximity sensor capable of being installed in a vehicle v detects proximity to an external object may be set as the change condition.

When the change condition is satisfied, the controller 110 may control the image with the second FPS value. In this case, the second FPS value may be 15 FPS. However, the second FPS value is not necessarily limited thereto, and any value smaller than the first FPS value, such as 10 FPS, 20 FPS, or 17 FPS, may be selected.

The controller 110 may acquire an image from the camera unit 140 and calculate brightness even while controlling at the second FPS.

In this case, the controller 110 may determine whether the calculated brightness is less than the second set value.

When the brightness is less than the second set value, the controller 110 may increase the brightness of the image by increasing the exposure time of the image sensor of each camera of the camera unit 140.

When the second FPS is 15 FPS, the maximum exposure time of the image sensor is 1/15 sec.

On the other hand, when the brightness is less than the second set value even though the exposure time of the image sensor is maximized at the current FPS, the controller 110 may terminate the operation based on the second FPS and operate the surround view based on a third FPS that is lower than the second FPS.

The controller 110 may increase the exposure time of the image sensor within an allowable range until the brightness reaches or exceeds the second set value.

According to the aforementioned operation, the present disclosure has an effect of reaching the same target brightness even when the amount of light is relatively insufficient compared to the environment operated by the first FPS by changing the FPS to the second FPS and increasing the exposure time of the image sensor until the brightness reaches the second set value, which is a target brightness, when the brightness is not sufficient in the first FPS.

When the FPS is changed from 30 FPS to 15 FPS, the controller 110 may adjust the exposure time in the range of $\frac{1}{30}$ sec$<$t$\leq\frac{1}{15}$ sec. The exposure time may be controlled to be less than $\frac{1}{30}$ sec, but to obtain an effect adjusted to 15 FPS, it is preferable that the exposure time be greater than $\frac{1}{30}$ sec.

In addition, the control of FPS by the controller 110 may assume a case where a desired brightness may not be reached even though all factors capable of affecting the brightness other than the FPS, such as the exposure time, the aperture, and ISO, are controlled.

In operating the surround view, the controller 110 may operate the surround view by changing the FPS value for at least some regions. In this case, differences in the number of frames may occur in synthesizing images. The differences in frame numbers may be compensated for by methods such as image duplication or image interpolation.

The controller 110 may return the surround view, which has been operated by the second FPS, to operation based on the first FPS again according to a preset condition.

For example, a return condition may be determined to be satisfied when the brightness is greater than or equal to a set value. The set value here may be a higher value than the second set value.

For example, the return condition may be that the vehicle speed is greater than or equal to a set speed. This is because when the vehicle speed is greater than or equal to a certain speed, the smoothness and response of the image may be more important than brightness. However, the return is not necessarily performed when the speed is greater than or equal to the set speed, and the condition may be that the speed is less than the set speed.

For example, the return condition may be determined to be satisfied when the proximity sensor capable of being installed in the vehicle v detects proximity. In this case, it may be assumed that smooth real-time output of the image is more important than visibility.

The controller 110 may control the image using methods such as interpolation so that the bright image does not suddenly become dark upon the returning. That is, a sudden change in brightness is avoided.

FIG. 3 illustrates a method of controlling a surround view in a low light environment according to one embodiment of the present disclosure.

Referring to FIG. 3, in operation S210, the controller 110 operates a surround view based on a first FPS value.

Operating the surround view may be a concept that includes all necessary settings, controls, outputs, and the like, from acquiring images by controlling the camera unit 140 to synthesizing and displaying the images.

FIG. 4 shows operation S210 in detail.

Referring to FIG. 4, in operation S211, the controller 110 receives an image and calculates the brightness.

The image may be one of the images acquired from each camera of the camera unit 140 or a synthesized image thereof.

When calculating the brightness of the image, the controller 110 may average a value of each pixel of the image. The brightness of the image may also be calculated by averaging the value of each pixel of a gray scale image.

According to the embodiment, the brightness may be a value measured by an illumination sensor. In this case, the controller 110 does not need to receive an image to determine the brightness, and may generate a value related to the brightness only with a value provided by the illumination sensor.

Operation S211 may be performed according to a set cycle or according to settings by other parameters.

In operation S212, the controller 110 determines whether the brightness is less than a second set value. When the brightness is less than the second set value, the process proceeds to operation S213, and when the brightness is greater than or equal to the second set value, the process returns to operation S211.

Describing a first set value first, the first set value may be the minimum brightness level to secure visibility. The first set value may be input or set in advance and stored.

The second set value relates to a target brightness at a level that allows a user to feel comfortable while securing visibility, and the second set value may be set to be a larger value than the first set value.

In operation S213, a determination as to whether an exposure time of each camera is smaller than the maximum exposure time possible at the current first FPS value is made. When the exposure time is less than the maximum exposure time, the process proceeds to operation S214, and when the exposure time is equal to the maximum exposure time, the process proceeds to operation S220.

The first FPS value may be 30 FPS.

The exposure time may refer to a shutter speed of the camera.

The maximum exposure time may be less than $\frac{1}{30}$ sec when the first FPS is 30 FPS. However, for convenience of description, the maximum exposure time is described as 1/(current FPS value) sec.

In operation S214, the controller 110 increases the exposure time of the image sensor of the camera unit 140.

For example, when the current exposure time is $\frac{1}{45}$ sec and the brightness is not sufficient, the brightness of the image may be secured by increasing the exposure time to $\frac{1}{40}$ sec, $\frac{1}{35}$ sec, $\frac{1}{30}$ sec, and so on.

Referring again to FIG. 3, in operation S220, the controller 110 determines a change condition.

The determination of the change condition may be either a condition based on the system's default settings or a condition set or entered by the user. When the change condition is satisfied, the process proceeds to operation S230, and when the change condition is not satisfied, operation S210 is maintained.

In one embodiment, the change condition is to determine whether the brightness is less than the first set value. When the brightness is less than the first set value, the process proceeds to operation S230, and when the brightness is greater than or equal to the first set value, the process returns to operation S210. In this case, it may be assumed that the exposure time of the image sensor is set to the maximum value under the first FPS value. That is, the change condition may be understood as a condition for adjusting the FPS value when the brightness is not sufficient even though the maximum amount of light is received at the first FPS value.

In one embodiment, the change condition may be whether or not the user of the vehicle v has input.

In one embodiment, a case where a vehicle speed is greater than or equal to a preset speed or less than the preset speed may be set as the change condition. In this case, the controller 110 may receive information about the vehicle speed.

In one embodiment, a case where a proximity sensor capable of being installed in the vehicle v detects proximity to an external object may be set as the change condition. This is because more caution is required when proximity is detected.

FIG. 10 illustrates the display unit 130 installed in the vehicle. A "night mode" button is displayed on the left side of the display unit 130. The change condition may be set to be achieved when the button is touched.

The night mode may mean providing the surround view based on a second FPS value in an environment with an insufficient amount of light, such as at night.

The user may touch the night mode to immediately activate the night mode regardless of the condition, or set the night mode to operate according to detailed condition settings according to options.

On the right side of the display unit 130, options for detailed night mode settings may be displayed.

"FPS priority" places more importance on the smooth flow of the image than the brightness of the surround view image. When "FPS priority" is selected, the first set value, which is the standard for switching to the night mode, may be lower than the default set value.

"Brightness priority" places more importance on brightness than the smooth flow of the surround view image. When "brightness priority" is selected, the first set value, which is the standard for switching to the night mode, may be higher than the default set value.

"Default setting" applies a default value of the night mode. Default settings may be preset values at the time of system production or software installation or update.

In operation S230, the controller 110 operates the surround view based on the second FPS value.

Operating the surround view may be a concept that includes all necessary settings, controls, outputs, and the like, from acquiring images by controlling the camera unit 140 to synthesizing and displaying the images.

FIG. 5 illustrates operation S230 in detail according to one embodiment of the present disclosure.

Referring to FIG. 5, in operation S231, the controller 110 controls the image with the second FPS value.

Controlling the image with the second FPS value may include controlling the camera unit 140 to acquire each camera image according to the second FPS value, synthesizing the images, and outputting the synthesized image according to the second FPS value.

The second FPS value may be 15 FPS. However, the second FPS value is not necessarily limited thereto, and any value smaller than the first FPS value, such as 10 FPS, 20 FPS, or 17 FPS, may be selected.

In operation S232, the controller 110 receives the image and calculates the brightness.

The image may be one of the images acquired from each camera of the camera unit 140 or a synthesized image thereof.

When calculating the brightness of the image, the controller 110 may average a value of each pixel of the image. The brightness of the image may also be calculated by averaging the value of each pixel of a gray scale image.

According to the embodiment, the brightness may be a value measured by an illumination sensor. In this case, the controller 110 does not need to receive an image to determine the brightness, and may generate a value related to the brightness only with a value provided by the illumination sensor.

Operation S232 may be performed according to a set cycle or according to settings by other parameters.

In operation S233, the controller 110 determines whether the brightness is less than the second set value. When the brightness is less than the second set value, the process proceeds to operation S234, and when the brightness is greater than or equal to the second set value, the process returns to operation S232.

The second set value relates to a target brightness at a level that allows the user to feel comfortable while securing visibility, and the second set value may be set to be a larger value than the first set value.

In operation S234, a determination as to whether an exposure time of each camera is smaller than the maximum exposure time possible at the current second FPS value is made. When the exposure time is less than the maximum exposure time, the process proceeds to operation S235, and when the exposure time is equal to the maximum exposure time, the process proceeds to operation S250.

The second FPS value may be 15 FPS.

The exposure time may refer to a shutter speed of the camera.

The maximum exposure time may be less than $\frac{1}{15}$ sec when the second FPS is 15 FPS. However, for convenience of description, the maximum exposure time is described as 1/(current FPS value) sec.

In operation S235, the controller 110 increases the exposure time of the image sensor of the camera unit 140.

For example, when the current exposure time is $\frac{1}{25}$ sec and the brightness is not sufficient, the brightness of the image may be secured by increasing the exposure time to $\frac{1}{20}$ sec, $\frac{1}{18}$ sec, $\frac{1}{15}$ sec, and so on.

In operation S250, the controller 110 operates the surround view based on a third FPS value. This operation may be performed in a limited way when visibility is not secured even by the second FPS value.

The third FPS value may be smaller than the second FPS value.

Since operating the surround view based on the third FPS value may be performed in the same way as operating the surround view based on the second FPS value, the description thereof will be replaced with the above-described description.

FIG. 7 illustrates a change in a surround view displayed according to an embodiment of the present disclosure.

The left side of FIG. 7 represents the surround view according to the first FPS, and the right side represents the surround view according to the second FPS. It can be seen that the visibility of the right image is improved compared to the left image.

FIG. 6 illustrates operation S230 in detail according to another embodiment of the present disclosure.

Referring to FIG. 6, in operation S236, the controller 110 receives vehicle movement information.

The vehicle movement information may include the vehicle's forward speed, backward speed, and steering wheel rotation information.

In operation S237, the controller 110 controls the image with the second FPS value for a region corresponding to a movement direction.

FIG. 8 illustrates a surround view displayed differently for each region according to an embodiment of the present disclosure.

The surround view is output as one image for each frame by synthesizing images of a front region fv of the vehicle v captured by the front camera 141, a rear region rv captured by the rear camera 142, a left region lsv captured by the left camera 143, and a right region rsv captured by the right camera 144.

The region corresponding to the movement direction may mean, for example, the rear region rv in the case of backward movement. That is, since when the vehicle moves backward, more attention is needed for the rear region rv, only the image for the rear region rv may be processed as the second FPS value.

When only the image captured by the rear camera 142 is based on the second FPS, and the images captured by the front camera 141, the left camera 143, and the right camera 144 are based on the first FPS, there is a difference between the number of captured images and the number of synthesized images. In order to match the number of images captured by the rear camera 142 to the number of synthesized images, a method of copying or interpolating part of the image may be selected.

For example, in order to make a 15-frame image into a 30-frame image, the same image may be generated for each of the 15 frames and used for synthesis into the 30-frame image. For example, in order to make a 15-frame image into a 30-frame image, interpolated images may be generated between 15 frames and used for synthesis into the 30-frame image. The interpolated images may be generated by predicting image information about an intermediate point of change between one image and a changed image.

FIG. 9 illustrates a surround view displayed differently for each region according to an embodiment of the present disclosure.

The region corresponding to the movement direction may mean, for example, the right region rsv and the rear region rv when the vehicle moves backward in a state in which the steering wheel is turned clockwise. In this case, the vehicle v turns and moves backward at the same time, and since a rear end of the vehicle moves to the right, more attention is needed on the right region rsv and the rear region rv, so that only images for the right region rsv and the rear region rv may be processed as the second FPS value.

In this case, the images captured by the rear camera 142 and the right camera 144 may be 15 FPS, and the images captured by the front camera 141 and the left camera 143 may be 30 FPS. Therefore, in order to match the number of images during synthesis, the number of images may be adjusted by the method of copying or interpolating the same image as described above so that a surround view with a 30 FPS synthesized image is output.

Referring again to FIG. 6, in operation S232-1, the controller 110 receives the image and calculates the brightness.

The image may be one of the images acquired from each camera of the camera unit 140 or a synthesized image thereof.

When calculating the brightness of the image, the controller 110 may average a value of each pixel of the image. The brightness of the image may also be calculated by averaging the value of each pixel of a gray scale image.

According to the embodiment, the brightness may be a value measured by an illumination sensor. In this case, the controller 110 does not need to receive an image to determine the brightness, and may generate a value related to the brightness only with a value provided by the illumination sensor.

In this operation, only the images for the regions corresponding to the movement direction may be received and the brightness thereof may be calculated.

Operation S232-1 may be performed according to a set cycle or according to settings by other parameters.

In operation S233-1, the controller 110 determines whether the brightness is less than the second set value. When the brightness is less than the second set value, the process proceeds to operation S234-1, and when the brightness is greater than or equal to the second set value, the process returns to operation S232-1.

The second set value relates to a target brightness at a level that allows the user to feel comfortable while securing visibility, and the second set value may be set to be a larger value than the first set value.

In this operation, only the brightness of the regions corresponding to the movement direction may be compared with the second set value.

In operation S234-1, a determination as to whether an exposure time of each camera is smaller than the maximum exposure time possible at the current second FPS value is made. When the exposure time is less than the maximum exposure time, the process proceeds to operation S235-1, and when the exposure time is equal to the maximum exposure time, the process proceeds to operation S250-1.

The second FPS value may be 15 FPS.

The exposure time may refer to a shutter speed of the camera.

The maximum exposure time may be less than $\frac{1}{15}$ sec when the second FPS is 15 FPS. However, for convenience of description, the maximum exposure time is described as 1/(current FPS value) sec.

In this operation, only the exposure time of the camera for the region corresponding to the movement direction is determined.

In operation S235-1, the controller 110 increases the exposure time of the image sensor of the camera unit 140.

For example, when the current exposure time is $\frac{1}{25}$ sec and the brightness is not sufficient, the brightness of the image may be secured by increasing the exposure time to $\frac{1}{20}$ sec, $\frac{1}{18}$ sec, $\frac{1}{15}$ sec, and so on.

In this operation, only the exposure time of the camera for the region corresponding to the movement direction is increased.

In operation S250-1, the controller 110 operates the surround view based on a third FPS value. This operation may be performed in a limited way when visibility is not secured even by the second FPS value.

The third FPS value may be smaller than the second FPS value.

Since operating the surround view based on the third FPS value may be performed in the same way as operating the surround view based on the second FPS value, the description thereof will be replaced with the above-described description.

In this operation, the third FPS value may be used only for the region corresponding to the movement direction.

According to the embodiment, the operation may be performed by relating the movement direction to the proximity sensor. When the proximity sensor capable of being installed in the vehicle v detects proximity to an external object, the controller 110 may control the image with a second FPS value for a region related to the movement direction. That is, when a distance to the external object gets closer, a condition may be set so that only the region may receive a large amount of light to display only the region to be brighter than other regions in the surround view, thereby allowing the driver to pay more attention.

Referring again to FIG. 3, in operation S240, the controller 110 determines a return condition. When the return condition is satisfied, the process returns to operation S210, and when the return condition is not satisfied, operation S230 is maintained.

According to one embodiment, the return condition may be determined to be satisfied when the brightness is greater than or equal to a set value. The set value here may be a higher value than the second set value.

According to one embodiment, the return condition may be determined to be satisfied when the speed of the vehicle is greater than or equal to a set speed. This is because when the vehicle speed is greater than or equal to a certain speed, the smoothness and response of the image may be more important than brightness. However, the return is not necessarily performed when the speed is greater than or equal to the set speed, and the condition may be that the speed is less than the set speed.

According to one embodiment, the return condition may be determined to be satisfied when the proximity sensor capable of being installed in the vehicle v detects proximity. In this case, it may be assumed that smooth real-time output of the image is more important than visibility.

Since the image may suddenly become dark upon returning, for some images, interpolated images may be artificially changed, generated, and output. The interpolated image is intended to smoothly connect a bright image and a dark image, and may be an image in which the brightness of a portion of the dark image is arbitrarily adjusted.

FIG. 11 illustrates a method of controlling a surround view in a low light environment according to one embodiment of the present disclosure.

Referring to FIG. 11, in operation S310, the controller 110 operates a surround view based on a first FPS value.

In operation S320, the controller 110 determines a change condition. The change condition may be determining whether the brightness is less than the first set value. When the brightness is less than the first set value, the process proceeds to operation S330, and when the brightness is greater than or equal to the first set value, the process returns to operation S310. When the brightness is greater than or equal to the first set value, the controller 110 may adjust the brightness to an appropriate level by controlling at least one of the exposure time, the aperture, and ISO according to a brightness level.

In operation S330, the controller 110 controls the image with a second FPS value.

In operation S340, the controller 110 receives the image and calculates the brightness.

In operation S350, the controller 110 determines whether the brightness is less than a second set value. When the brightness is less than the second set value, the process proceeds to operation S380, and when the brightness is greater than or equal to the second set value, the process proceeds to operation S360.

In operation S360, the controller 110 determines whether the brightness is greater than or equal to a third set value. When the brightness is greater than or equal to the third set value, the process proceeds to operation S370, and when the brightness is less than the third set value, the process proceeds to operation S340.

The third set value may be a greater value than the second set value. The third set value may be set in consideration of the degree to which the user feels uncomfortable due to the high brightness level.

In step S370, the controller 110 returns the FPS value from the second FPS value to the first FPS value. For example, the controller 110 may adjust 15 FPS to return to 30 FPS.

In operation S380, the controller 110 may determine whether the exposure time of the camera is smaller than the maximum exposure time possible at the second FPS value. When the exposure time is less than the maximum exposure time, the process proceeds to operation S390, and when the exposure time is equal to the maximum exposure time, the process proceeds to operation S395.

In operation S390, the controller 110 increases the exposure time of the image sensor of the camera unit 140. Then, the process returns to operation S340.

In operation S395, the controller 110 operates the surround view based on a third FPS value. This operation may be performed in a limited way when visibility is not secured even by the second FPS value.

According to the embodiment illustrated in FIG. 11, when the brightness becomes too large after reducing the FPS value, the FPS value may be returned to the original FPS value.

FIG. 12 illustrates a method of controlling a surround view in a low light environment according to one embodiment of the present disclosure.

In operation S410, the controller 110 operates a surround view based on a first FPS value.

In operation S420, the controller 110 receives an image and calculates the brightness of each of the four regions, that is, front, rear, left, and right regions.

In operation S430, the controller 110 determines whether the brightness of some of the four regions, that is, the front, rear, left, and right regions is less than a first set value. When the brightness is less than the first set value, the process proceeds to operation S440, and when the brightness is greater than or equal to the first set value, the process returns to operation S420.

The determination in operation S430 may be to determine whether the brightness of some regions is less than the first set value even though all means other than FPS, such as the aperture, ISO, and the exposure time, are adjusted. For example, when the current exposure time is not maximum, the exposure time may be adjusted before proceeding to S440.

In operation S440, the controller 110 operates the surround view based on the second FPS value for some regions.

The embodiment illustrated in FIG. 12 may be effective when the brightness of only some of the four regions needs to be adjusted, for example, in a situation where there is external lighting in the front that is sufficiently bright, but the amount of light is not sufficient in the rear. As described above, the brightness adjustment for some region is not necessarily limited to FPS and may be achieved by adjusting the aperture, ISO, and the exposure time.

FIG. 13 illustrates a method of controlling a surround view in a low light environment according to one embodiment of the present disclosure.

In operation S510, the controller 110 operates a surround view based on a first FPS value.

In operation S520, the controller 110 receives detection information from the proximity sensor. The controller 110 receives the detection information from the proximity sensor and determines a corresponding region. The region may be at least one of the front region fv, the rear region rv, the left region lsv, and the right region rsv, which have been described above.

In operation S530, the controller 110 determines whether the brightness of the corresponding region is less than a fourth set value. When the brightness is less than the fourth set value, the process proceeds to operation S540, and when the brightness is greater than or equal to the fourth set value, the process returns to operation S520. The fourth set value may be equal to, lower than, or higher than the first set value.

In operation S540, the controller 110 may increase a brightness level by controlling at least one of the aperture, ISO, the exposure time, and the second FPS value for some regions.

According to the embodiment, the brightness of a proximity sensor detection response region may be adjusted without determining the brightness of some regions.

According to the embodiment illustrated in FIG. 13, there is an effect of performing control so that, when the vehicle is close to an external object and there is a risk of collision, the brightness of a corresponding region is adjusted to allow a driver to perceive the object more clearly.

The present disclosure has an effect of responding to low light limit situations of a surround view by adjusting frames per second (FPS) and an image sensor exposure time even in environments with an insufficient amount of light, such as at night.

The present disclosure has an effect of securing visibility even in a low light environment through software development without changing the hardware of an existing surround view system.

The terms used in the present application are merely provided to describe specific embodiments, and are not intended to limit the present disclosure. In the present application, it will be understood that terms "include," "have," or the like are intended to specify the presence of features, integers, steps, operations, elements, components, and/or combinations thereof stated in the specification, but do not preclude the possibility of the presence or addition of one or more other features, integers, steps, operations, elements, components, or combinations thereof in advance.

The invention claimed is:

1. A system for controlling a surround view in a low light environment, the system comprising:
a camera unit including a plurality of cameras that acquire images in at least two directions of a vehicle;
an image synthesizer configured to synthesize a plurality of images acquired from the camera unit into one image;
a display unit configured to display the synthesized image in a surround view; and
a controller,
wherein the controller operates the surround view based on a first frame per second (FPS) value, and
the controller calculates brightness from the images received from the camera unit, and operates the surround view based on a second FPS value lower than the first FPS value when the brightness is less than a first set value,
wherein the display unit displays selection information of options including FPS priority, brightness priority, and a default setting,
the controller operates the surround view based on the second FPS value lower than the first FPS value by changing a condition according to the selection information of options, the default setting is conditioned on whether the brightness of the image captured for the surround view is less than the first set value,
the FPS priority is conditioned on whether the first set value is set to be lower than the default setting and the brightness of the image captured for the surround view is less than the first set value, and
the brightness priority is conditioned on whether the first set value is set to be higher than the default setting and the brightness of the image captured for the surround view is less than the first set value.

2. The system of claim 1, wherein the controller operates the surround view based on the second FPS value lower than the first FPS value when night mode input is recognized by a user.

3. The system of claim 1, further comprising a proximity sensor configured to detect proximity to an external object, wherein the controller operates the surround view based on the second FPS value lower than the first FPS value when the proximity is detected.

4. The system of claim 1, wherein the controller increases an exposure time of an image sensor of the camera unit when brightness of an image acquired by the second FPS value is less than a second set value, and
the second set value is a value greater than the first set value.

5. The system of claim 1, wherein the controller returns to the first FPS value when brightness of an image acquired by the second FPS value is greater than or equal to a third set value.

6. The system of claim 1, wherein the first FPS value is 30 FPS, and
the second FPS value is 15 FPS.

7. The system of claim 1, wherein surround view operation based on the second FPS value is applied only to some among a front region, a rear region, a left region, and a right region.

8. The system of claim 7, wherein the controller receives movement information about the vehicle, and determines a region to which operation based on the second FPS value is to be applied among the regions of the surround view corresponding to the movement information.

9. The system of claim 1, wherein the controller compares a vehicle speed with a preset speed, and returns surround view operation based on the second FPS value to surround view operation based on the first FPS value according to the comparison result.

10. The system of claim 9, wherein the controller interpolates the brightness of some of the images based on the first FPS value after the returning so that a sudden change in brightness does not occur upon the returning.

11. A system for controlling a surround view in a low light environment, the system comprising:
a camera unit including a plurality of cameras that acquire images in at least two directions of a vehicle;
an image synthesizer configured to synthesize a plurality of images acquired from the camera unit into one image;
a display unit configured to display the synthesized image in a surround view; and
a controller,
wherein the controller operates the surround view based on a first frame per second (FPS) value, and
the controller calculates brightness of each of a front region, a rear region, a left region, and a right region from images received from the camera unit, and operates the surround view based on a second FPS value lower than the first FPS value for each region when the brightness corresponding to the region is less than a first set value, wherein the display unit displays selection information of options including FPS priority, brightness priority, and a default setting, the controller operates the surround view based on the second FPS value lower than the first FPS value for each region by changing a condition according to the selection information of options, the default setting is conditioned on whether the brightness of the image captured for the surround view is less than the first set value, the FPS priority is conditioned on whether the first set value is set to be lower than the default setting and the brightness of the image captured for the surround view is less than the first set value, and the brightness priority is conditioned on whether the first set value is set to be higher than the default setting and the brightness of the image captured for the surround view is less than the first set value.

12. A method of controlling a surround view in a low light environment, the method comprising:

displaying selection information of options including FPS priority, brightness priority, and a default setting;

operating the surround view based on a first FPS value;

calculating brightness and determining whether the brightness is less than a first set value;

operating the surround view based on a second FPS value lower than the first FPS value when the brightness is less than the first set value; and operating the surround view based on the second FPS value lower than the first FPS value by changing a condition according to the selection information of options, wherein, the default setting is conditioned on whether the brightness of the image captured for the surround view is less than the first set value, the FPS priority is conditioned on whether the first set value is set to be lower than the default setting and the brightness of the image captured for the surround view is less than the first set value, and the brightness priority is conditioned on whether the first set value is set to be higher than the default setting and the brightness of the image captured for the surround view is less than the first set value.

13. The method of claim 12, wherein the operating of the surround view based on the second FPS value includes:

receiving an image based on the second FPS value;

calculating brightness of the image;

determining whether the calculated brightness of the image is less than a second set value; and increasing an exposure time of an image sensor of a camera unit when the calculated brightness of the image is less than the second set value, and the second set value is a value greater than the first set value.

14. The method of claim 12, wherein the operating of the surround view based on the second FPS value includes:

receiving an image based on the second FPS value;

calculating brightness of the image;

determining whether the calculated brightness of the image is greater than or equal to a third set value; and returning to the first FPS value when the calculated brightness of the image is greater than or equal to the third set value.

15. The method of claim 12, wherein the first FPS value is 30 FPS, and the second FPS value is 15 FPS.

16. The method of claim 12, wherein surround view operation based on the second FPS value is applied only to some among a front region, a rear region, a left region, and a right region.

17. The method of claim 16, further comprising:

receiving movement information about a vehicle; and determining a region to which operation based on the second FPS value is to be applied among the regions of the surround view corresponding to the movement information.

18. The method of claim 12, further comprising:

comparing a vehicle speed with a preset speed; and returning surround view operation based on the second FPS value to surround view operation based on the first FPS value according to the comparison result.

19. The method of claim 18, further comprising interpolating the brightness of some of the images based on the first FPS value after the returning so that a sudden change in brightness does not occur upon the returning.

* * * * *